RANDOM SIGNAL GENERATOR

Filed July 20, 1965

5 Sheets-Sheet 1

INVENTORS
REGINALD CATHERALL
DAVID A. G. TAIT &
MICHAEL J. SKINNER

By: Hurwitz & Rose
ATTORNEYS

RANDOM SIGNAL GENERATOR

Filed July 20, 1965 5 Sheets-Sheet 2

INVENTORS
REGINALD CATHERALL
DAVID A. G. TAIT &
MICHAEL J. SKINNER
BY Hurvitz & Rose
ATTORNEYS INVENTORS
REGINALD CATHERALL
DAVID A. G. TAIT &
MICHAEL J. SKINNER
BY Hurwitz & Rose
ATTORNEYS

INVENTORS
REGINALD CATHERALL
DAVID A. G. TAIT &
MICHAEL J. SKINNER

BY Hurvitz & Rose

ATTORNEYS

INVENTORS
REGINALD CATHERALL
DAVID A. G. TAIT &
MICHAEL J. SKINNER

BY Hurvitz & Rose
ATTORNEYS

United States Patent Office 3,366,779

Patented Jan. 30, 1968

3,366,779

RANDOM SIGNAL GENERATOR

Reginald Catherall, David A. G. Tait, and Michael J. Skinner, Farnborough, England, assignors to The Solartron Electronic Group Limited, Hampshire, England, a corporation of the United Kingdom of Great Britain and Northern Ireland Filed July 20, 1965, Ser. No. 473,313
26 Claims. (Cl. 235—152)

ABSTRACT OF THE DISCLOSURE

A random signal generator in which a plurality of bistable circuits are set or reset in accordance with the level or polarity, during each of a series of selected short intervals, of a random noise signal from a thyratron source. The level of the noise signal setting each bistable is uncorrelated from the signal setting each other bistable by providing plural noise sources or, in some embodiments, by sequentially sampling the output of a wide band source. The output signals from the bistables are added in analog fashion to produce a sum signal having a level which is a random one (at any instant) of a finite number of levels. In other embodiments the outputs are added digitally to provide a digital number which is a random one of a finite series of numbers.

The present invention relates to an electrical random signal or noise generator of the type used to provide test signals for electrical equipment. Such signals can be used with communication systems for non-linear distortion tests and for studies and simulation by autocorrelation methods of industrial processes, servo mechanisms and some types of optimizing control. For these tests it is advantageous to know and to be able to adjust the crest factor and spectral density of the test signal. It is also useful to know the R.M.S. output of the generator and for it to have a substantial output at low frequencies.

In a truly random noise signal, there is a Gaussian probability that peaks of any size may occur, the larger peaks having a smaller probability of occurrence. A generator for Gaussian noise is therefore impracticable and there is a limit to signal peaks in practical generators. One of the disadvantages of known generators is that this limit is not specified and cannot be adjusted. The term crest factor, defined as the ratio of peak signal amplitude to R.M.S. signal amplitude, is used to specify the peak signal limit. Another disadvantage of available noise generators is that at low frequencies the output spectral density (which expresses how the power of a noise signal is distributed with regard to frequency) varies in an indeterminate way. Such generators use photomultipliers with light sources, Geiger counters with radio-active sources, or gas discharge tubes to provide electrical noise. This disadvantage has been partly overcome in the past by taking a band of noise at relatively high frequencies and changing the frequencies to the required low frequency band. The R.M.S. level so produced over a narrow band is small so that much amplification is required. It is known to provide amplification in these circumstances by using pulse-stretching techniques. That is to say, the noise signal is sampled by means of low duty cycle pulses and each sample is stored for the whole of the cycle.

An object of the present invention is to provide a random electrical signal generator having R.M.S. output, crest factor and spectral density which are known and which can be varied.

Another object is to provide a generator having a substantial R.M.S. output at low frequencies.

According to the present invention there is provided a random electrical signal generator comprising a plurality M of bistable circuits, gating means arranged periodically to set each bistable circuit to one state or the other in accordance with the level of a random noise signal uncorrelated with the random noise signals used to set the other bistable circuits, whereby in each period of operation a random combination of states of the bistable circuits is set up and means for summing output signals generated by the bistable circuits in accordance with the states in which they are, whereby a sum signal is produced whose level in each period is a random one of a finite number of possible levels.

The bistable circuits may each generate in one state a zero signal and may generate in their other states a progression of analogue signals whose amplitudes may increase from bistable to bistable by a factor of 2, for example. In this case the sum signal will be an analogue representation of a binary number in the range 0 to $2^M-1$ where M is the number of bistables, a different binary number corresponding to each different combination of states of the bistables.

The sum signal changes level at a frequency equal to the frequency with which the gating means are operated and which will be called the gating frequency. A random signal which changes level at a frequency which is a submultiple $1/N$ of the gating frequency may be obtained by integrating the sum signal over successive intervals of N gating periods. This may be done by applying the sum signal alternately to two capacitors or other integrating circuits in successive intervals of N gating periods, the output in each interval being taken from the integrating circuit to which the sum signal is not being applied.

It may be arranged to discharge each integrator at the ends of the intervals during which it has provided the output signal.

Instead of converting the outputs of the bistable devices to an analogue sum signal and then integrating, the said outputs of the devices may be treated together as a binary number. The integration may then be performed simply by adding the binary numbers (sum signals) obtained in the required number of gating periods and the resulting sum is a digital output equivalent to the analogue output obtained from the first-mentioned arrangement. An analogue signal is readily obtained by means of a digital-to-analogue converter.

The adder for adding the binary numbers may consist of the bistable circuits themselves connected together so as to transfer carries, plus P additional bistable circuits allowing addition to take place over the required number of gating periods.

In this digital embodiment it may be desirable to gate the noise signals to the bistable circuits sequentially, in order to allow time for carries to propagate through the adder. Provided the bandwidth is great enough in relation to the interval between setting successive bistables, a single source may be used to set all bistables in such a case. In other cases individual sources should be used to ensure that there is no correlation between the signals used to set different bistables.

In the digital embodiment two adders may be used alternately like the two integrating circuits of the analogue embodiment. It is also possible to use a single adder and to clear its count to a staticiser at the end of each integrating period, the staticiser providing the digital output, from which an analogue output may be obtained using a converter as already mentioned.

In order to sum over the required number N of gating periods, it is merely necessary to apply the outputs of the M bistable circuits to the M least significant stages of an $M+P$ stage binary adder, and to take the output from the stages $n$ to $n+M$ of the adder, where $2^{n-1} \leq N < 2^n$.

P must clearly equal the value of $n$ required to give the maximum value needed for N.

In all embodiments, the noise signal is preferably highly amplified to obtain either a strongly positive or strongly negative signal for setting the bistable circuit to one state or the other. The positive and negative signals may be limited to standard amplitude values.

As will be shown hereinafter, the spectral densities of the sum signal and the integrated output signal obtained over N gating periods may be varied by varying the gating frequency. The crest factor depends both upon the number M of bistable circuits and the number N of gating periods in each integration interval. Means may readily be provided for varying either or both of these numbers. Variations of all the above factors alter the R.M.S. value of the sum signal and the output signal. In the analogue embodiment, the R.M.S. value of the output signal also depends upon the effective capacitance of the integrating circuits which may be made variable, e.g. for maintaining a constant R.M.S. value irrespective of variations of crest factor or spectral density.

The gating frequency and the submultiple frequency may both be obtained from a common master pulse generator in conjunction with frequency dividing and/or multiplying stages. Arrangements may be made for varying the effective number of such stages as well as the frequency of the generator.

Certain forms of the invention will now be described by way of example, with reference to the drawings, in which.

Figure 1:
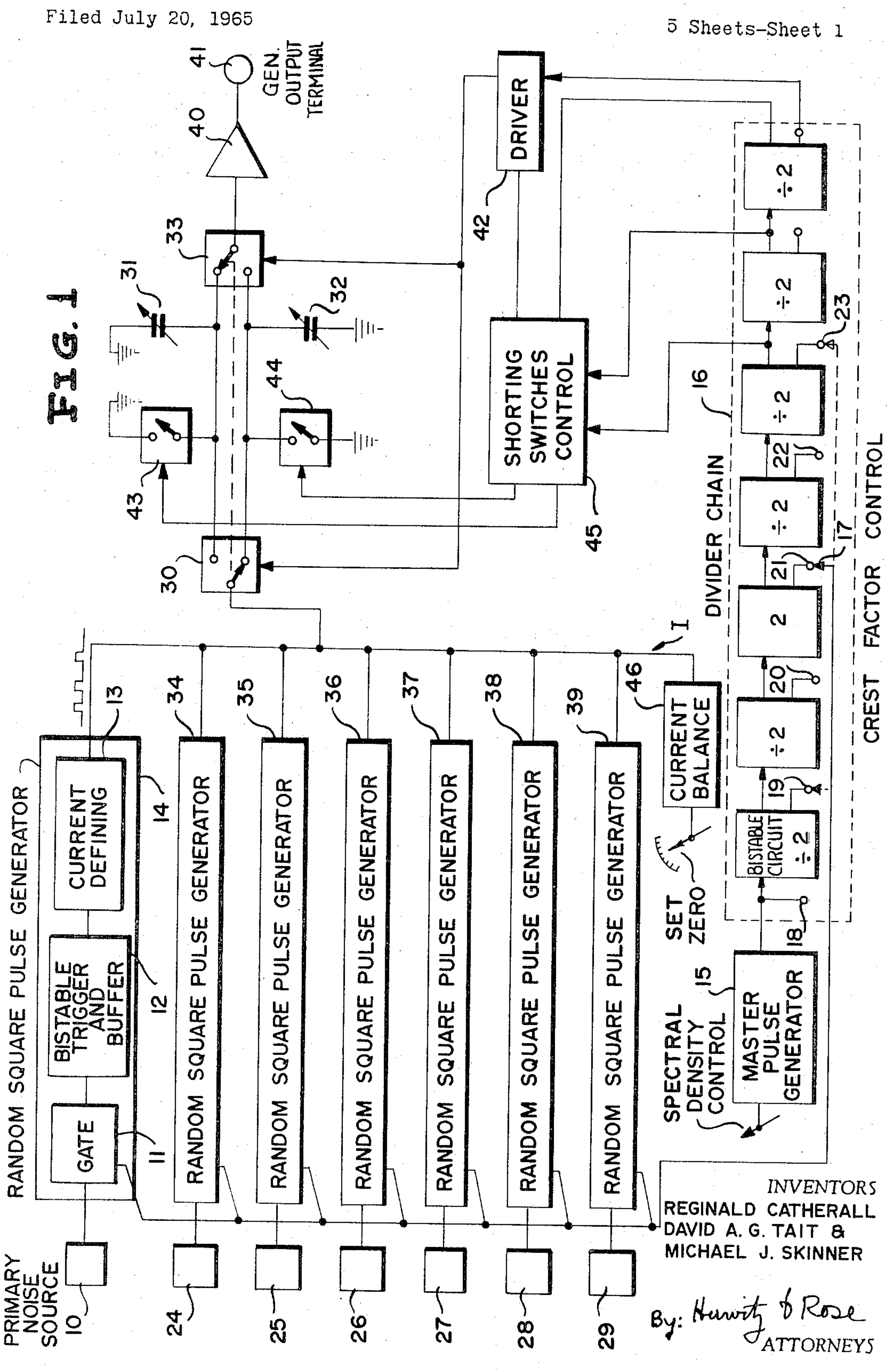
FIGURE 1 is a block diagram of an analogue embodiment of the invention.

Referring to FIGURE 1, a primary noise source 10 has an output which is amplified and limited by diodes (not shown) to a maximum value which may be either positive or negative and is fed through a gate 11 to a bistable trigger and buffer circuit 12. The gate 11 is opened for a short interval at times determined by a periodic signal derived from a master pulse generator 15 by division using a divider chain 16 which consists of 7 bistable circuits, each dividing the master pulse generator frequency by two. A switch arm 17 can be moved to any of the positions 18 to 23, there dividing the master pulse generator frequency by from 1 to 32, respectively. The period between successive openings of the gate is long compared with the reciprocal of the bandwidth of the source 10, thus avoiding correlation between the gate output in successive openings. The bistable trigger circuit 12 is triggered to one state or the other, depending upon whether the noise signal is positive or negative when the gate is opened. In this way the sign of the noise signal is stored when the gate is closed. A current defining signal generator 13 gives an output current of a predetermined magnitude when the circuit 12 is in one state but gives no output when the circuit is in the other state.

Noise passing into random square pulse generator 14, consisting of circuits 11, 12 and 13, therefore produces a train of square pulses, of predetermined constant magnitude. Whether a pulse is present or not in each gating period is, however, determined on a random basis.

Further primary noise sources 24 to 29 supply signals to random square pulse generators 34 to 39, respectively. These circuits produce currents of different predetermined magnitudes, according to a binary geometric series. The currents are combined and passed together to a changeover switch 30. Since there are $M=7$ random square pulse generators each with two states, the combined or sum current may take any one of $2^7$ values. An adjustable current balance circuit 46 which supplies a constant current in addition to the square pulse currents allows the average output of the generator to be set as desired.

The combined current is alternately fed to charge a capacitor 31 and a capacitor 32 by way of the changeover switch 30. When one is charging through the switch 30, the other is discharging through another changeover switch 33 to an amplifier 40, whose output provides the generator output at terminal 41. The switches 30 and 33 are controlled by a driver circuit 42, which changes the switches from one contact to another at the lowest frequency derived from the master pulse generator 15 through the divider chain 16.

The switching circuit can also include two shorting switches 43 and 44 controlled by a circuit 45 to short-circuit the capacitors 31 and 32 respectively for half the period of the switches 30 and 33 so that they can discharge their contents before being recharged through switch 30. The circuits 42 and 45 ensure that no capacitor is shorted during the changeover time of switches 30 and 33. This is necessary when switches 30 and 33 are transistor switches because the hole storage effect in a transistor may short-circuit the next capacitor to provide an output by acting as a "make before" switch.

The output voltage at terminal 41 is proportional to the voltage stored on a capacitor, which is in turn proportional to the total charge received during a charging interval. The maximum charge on a capacitor is obtained when all the individual charges are in the same sense and are maintained at their maximum value for the N periods of a charging interval. Then the maximum charge on the capacitor and hence the maximum output voltage is proportional to N and the maximum output power will therefore be proportional to $N^2$. As the noise pulses are uncorrelated, the average charge on the capacitor, and hence the average output voltage, is proportional to $\sqrt{N}$, and the average output power will therefore be proportional to N.

The ratio of peak to average power output is therefore N, and the crest factor (peak noise amplitude to average noise amplitude) is $\sqrt{N}$. Since the crest factor of a random equiprobable distribution of $2^7$ levels is nearly $\sqrt{3}$, the overall crest factor of the complete generator is nearly $\sqrt{3N}$.

To alter the crest factor, the contact 17 is moved to a new position so that the gating frequency is changed but the switches 30 and 33 operate at the same frequency.

For very low crest factors down 1, N is first reduced to 1 and then the random square pulse generators are progressively switched off, beginning with that one which has the lowest valued output current.

Figures 2, 3:
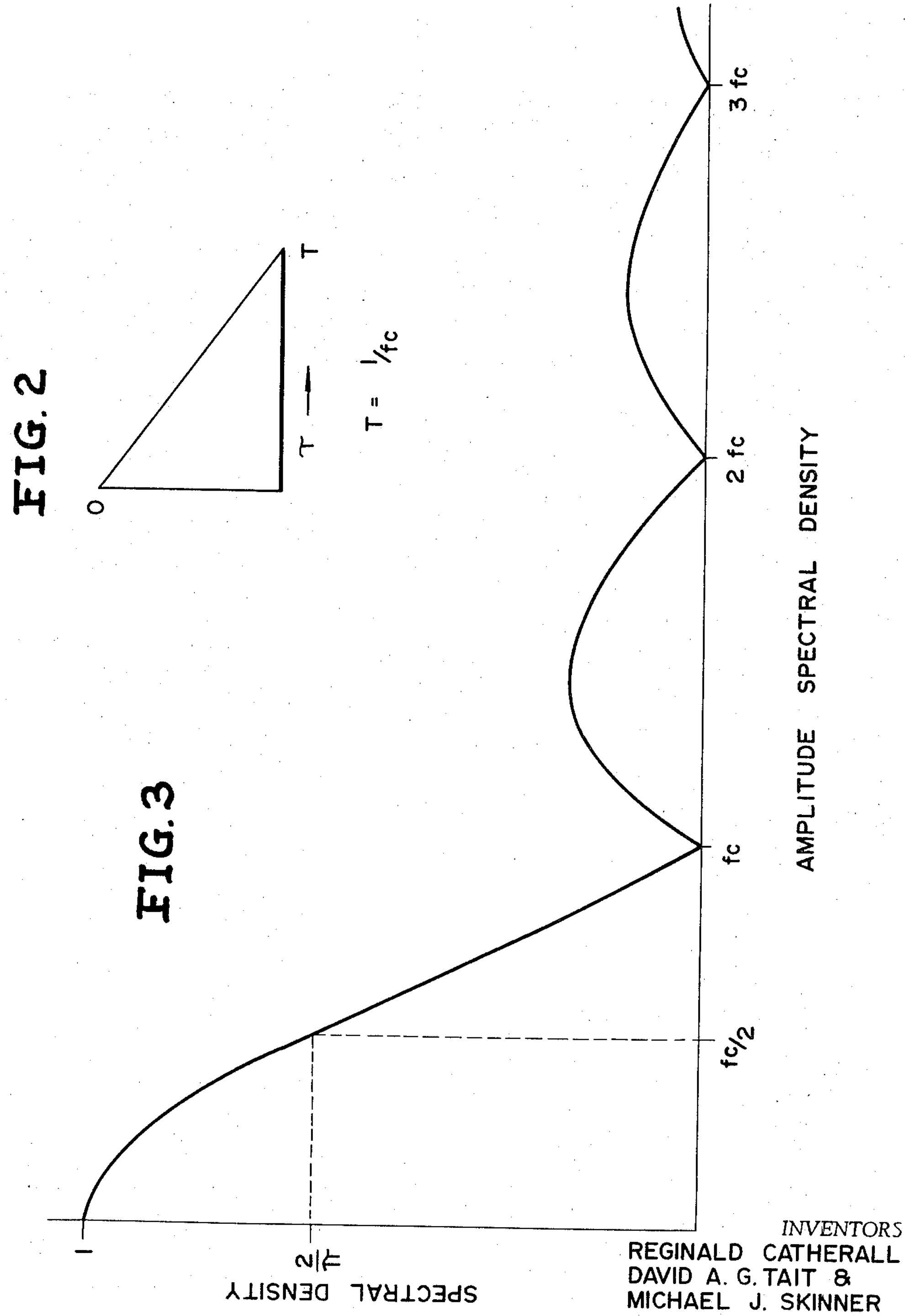
FIGURE 2 is a graph of the autocorrelation function of pulses triggered at random times in a given period.
FIGURE 3 is a spectral density graph of amplitude against frequency.

As stated above, spectral density expresses how the power of a noise signal is distributed with frequency. When an analysis of a noise signal is made, it is found that the spectral density is equal to the Fourier transform of the autocorrelation function with time (shown in FIGURE 2). For square pulses of equal duration $1/f_c$ none of which is correlated with its successor, the spectral density is proportional to $K(1-f_c t)$, where K is a constant and $t$ represents time. This is true only for $0<t<1/f_c$ and is zero at other times.

The amplitude spectral density is given by $$\frac{\text{Sin}\, x}{x}$$

where $x=\pi f/f_c$. The graph of amplitude spectral density against frequency is given in FIGURE 3, from which it can be calculated that the spectral density at a frequency $f$ is constant to within 1 db up to about $1/4f_c$, so that a desired band can be loaded with noise to this constancy or any other by changing $f_c$, i.e., by changing the gating frequency. This also changes the power per cycle per second, since the total power output of the generator is unchanged. To change the spectral density without changing the crest factor, the frequency of the master pulse generator is changed without changing the position of the divider switch 17.

In order to keep the average (R.M.S.) power output of the complete generator constant when crest factor and spectral density are changed, the capacitors 31 and 32 are made variable, and their capacitance is controlled so that the product of changeover rate and capacitance is kept constant. This may be done by ganging the capacitors to the crest factor and spectral density controls, if desired, or the controls may be independent.

By varying the control so as not to maintain the said constant, the average power output may be adjusted to a desired value.

Different characteristics are required of the switches 30 and 33 at different master pulse generator frequencies. Transistors are preferable at high frequencies, but relays may be used at low frequencies.

Figure 4:
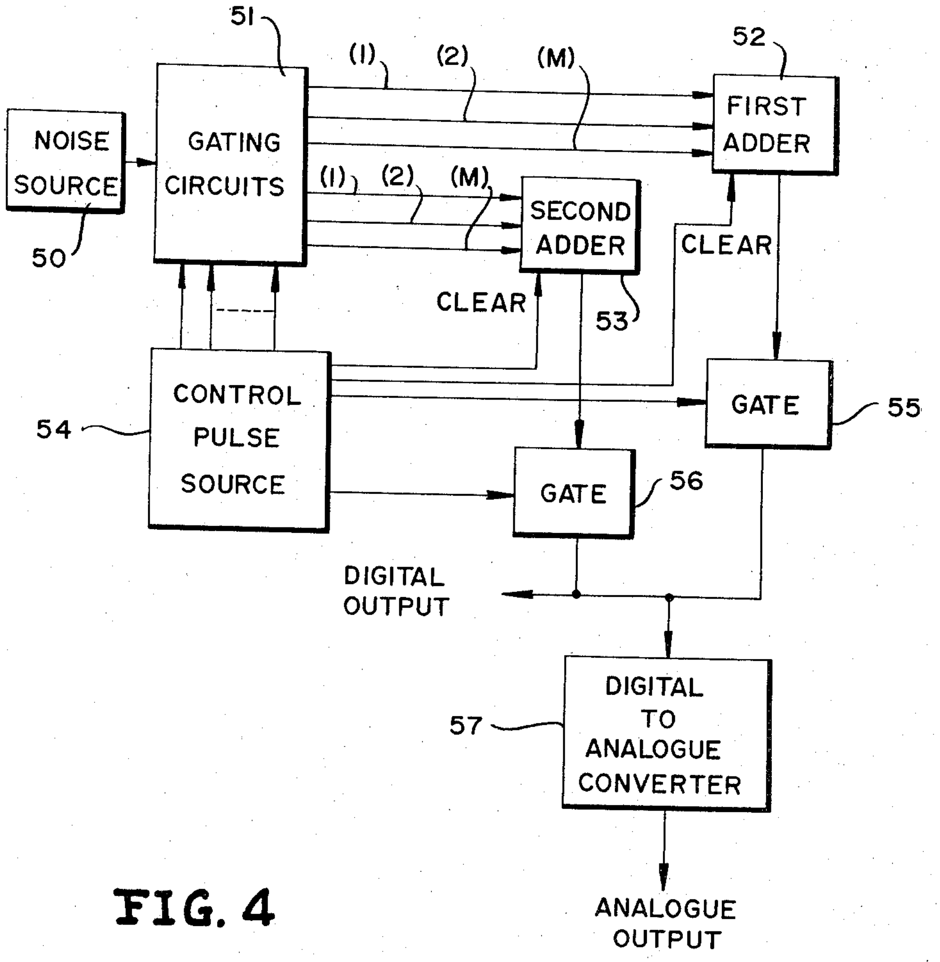
FIGURE 4 is a block diagram of a first digital embodiment of the invention.

In the embodiment illustrated in FIGURE 4, the output from a broadband noise source 50, which can be a gas discharge tube such as a thyratron, is applied through a set of gating circuits 51 to first and second adders 52 and 53 in alternate gating periods. The gating circuits are opened in the required sequence by means of a control pulse source 54, which also opens gates 55 and 56 in alternate integrating intervals to pass the outputs of adders 52 and 53 respectively to a digital to analogue converter 57. In an integration interval during which the first adder 52, for example, is providing an output through the gate 55, the adder 53 receives, in each of N gating periods, a random binary number in the range 0 to $2^M-1$. At the end of this integration interval, the adder 52 is cleared, the gate 55 is closed, the gate 56 is opened and the noise signals are applied through the gating circuits 51 to the adder 52.

Figure 5:
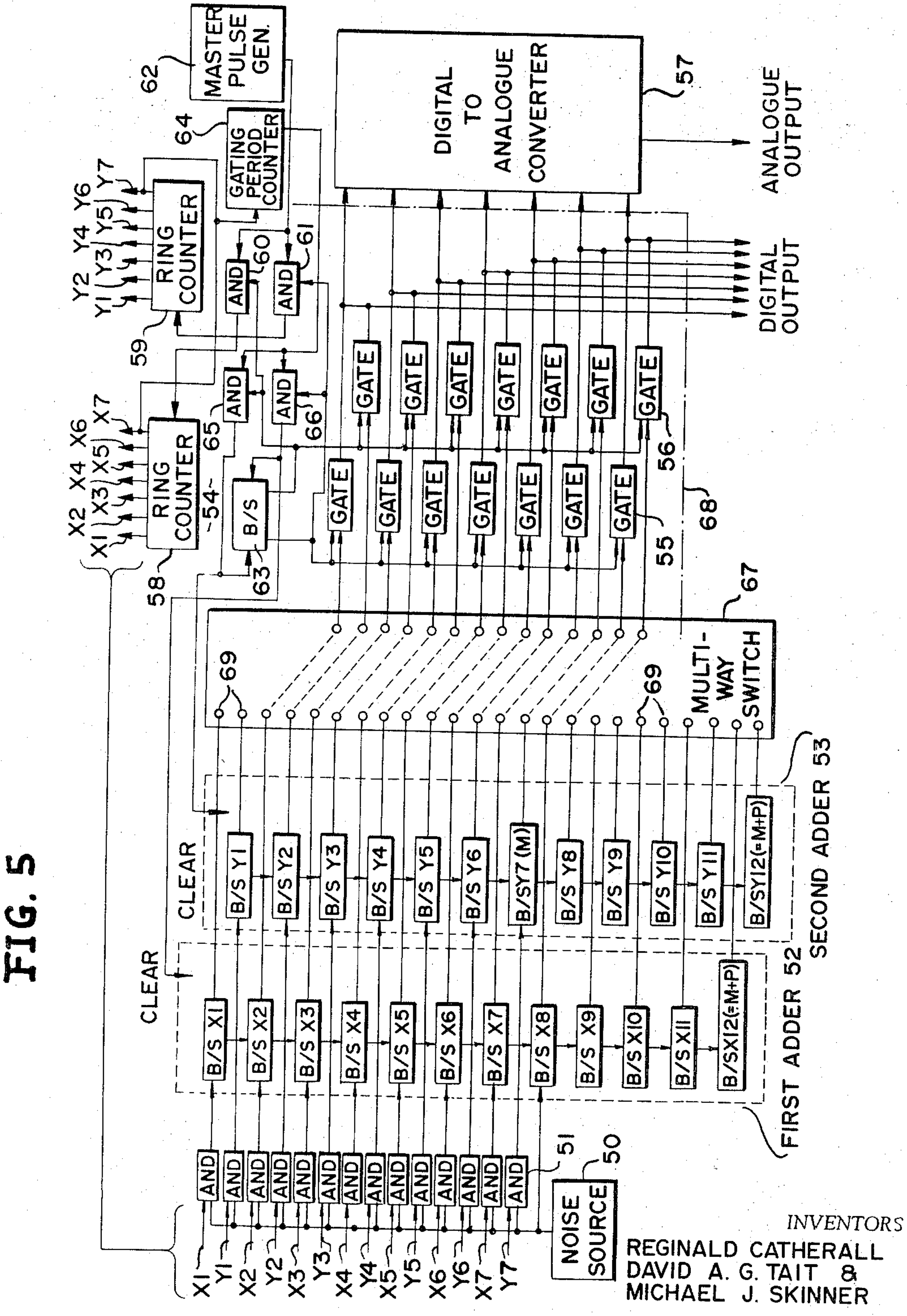
FIGURE 5 is a more detailed block diagram of the embodiment shown in FIGURE 4.

FIGURE 5 shows the arrangement in more detail and also shows how N may be varied to any one of the values 1 to 32. For the sake of completeness, a fairly detailed showing of the control pulse source 54 is given, though it will be appreciated that many different circuits could be devised to effect the required control.

In FIGURE 5, the first adder 52 comprises 12 bistable circuits, indicated as B/S X1 to B/S X12, of which the first seven are controlled from the noise source 50 through the gates 51, which have their control inputs correspondingly numbered X1 to X7. In like manner, the adder 53 comprises bistable circuits B/S Y1 to B/S Y12. In both adders, the bistable circuits are coupled in sequence to allow carries to propagate.

The control pulse source 54 of FIGURE 4 comprises the blocks shown at the top right-hand corner of FIGURE 5, including two 7-stage ring counters 58 and 59. The ring counters receive pulses selectively from a master pulse generator 62, of variable frequency, through corresponding gates 60 and 61. These gates are controlled by a bistable 63 which changes state at the end of each integration interval.

Consider firstly an interval which commences with the right-hand side of the bistable 63 being set. The output from the right-hand side opens the gate 60 and allows pulses to pass to the ring counter 58 whose seven outputs X1 to X7 are energized in turn, that is, the correspondingly numbered inputs of the gates 51 for the adder 52 are energized to open the gates and the seven digits (in increasing order of significance) of a random binary number are fed into the adder 52. During this time the gates 56 are also opened by the bistable 63 to take an output signal from the second adder 53.

The cycle thus far described constitutes one gating period, and at its termination, an output taken from X7 causes a gating period counter 64 to count 1. If the period of the generator 62 is $t$, the gating period is $Mt$. The counter 64 can count up to 32, but may be set in known manner to produce an output and simultaneously reset itself to zero at any binary number from 1 to 32, this number being N. At the end of N gating periods, therefore, that is to say at the end of the integration interval (of duration $NMt$), the counter 64 produces an output pulse which is applied to two gates 65 and 66. Only the gate 65 is opened by the right-hand side of the bistable 63 and, accordingly, the said output pulse passes through the gate 65 to change over the bistable 63, i.e., to set its left-hand side and also to clear the adder 53.

The left-hand side of the bistable 63 now opens the gates 55, 61 and 66, and N gating periods now follow with the adder 52 providing an output through gates 55 and the ring counter 59 functions to open those gates 51 which have inputs Y1 to Y7 in turn. At the end of this integration interval, the signal from the counter 64 passes through the gate 66 to clear the adder 52 and to set the right-hand side of the bistable 63 again, and so to bring the situation back to that initially assumed. The complete major cycle of operation (two integration intervals, each consisting of N gating periods) has now been described.

So far, the multi-way switch 67 shown between the adders 52 and 53 and the gates 55 and 56 has not been mentioned. This is used to select the appropriate seven pairs of output 69 from the bistables of the two adders in accordance with the selected value of N. Switch 67 is ganged to the control for the counter 64, as indicated by the line 68. It will be appreciated that for $N=1$, only the first 7 pairs of outputs 69 are relevant, and accordingly tion illustrated by broken line connections in the switch 67 to the gates 55 and 56. For $N=2$, the 8th pair of terminals 69 also become relevant, but in order to maintain a uniform output, this 8th pair must be considered as of the numerical significance assigned to the 7th pair when $N=1$. Accordingly, the first pair of terminals move below the binary point and they may be disregarded. Thus the second to eighth pairs, inclusive, of terminals 69 only need be connected to the gates 55 and 56 and this is the situation illustrated by broken line connection in the switch 67 in the drawing. Similarly for $N=4$, the third and ninth pairs, inclusive, of the terminals 69 are connected to the gates 55 and 56 and so on. This procedure introduces a rounding-off error which is not significant however.

This embodiment will operate at much lower frequencies than that of FIGURE 1, owing to the elimination of analogue integrators, and the same switching arrangements suffice at all frequencies. If necessary, seven individual noise sources may be provided as in FIGURE 1, instead of the single broadband source 50.

Figure 6:
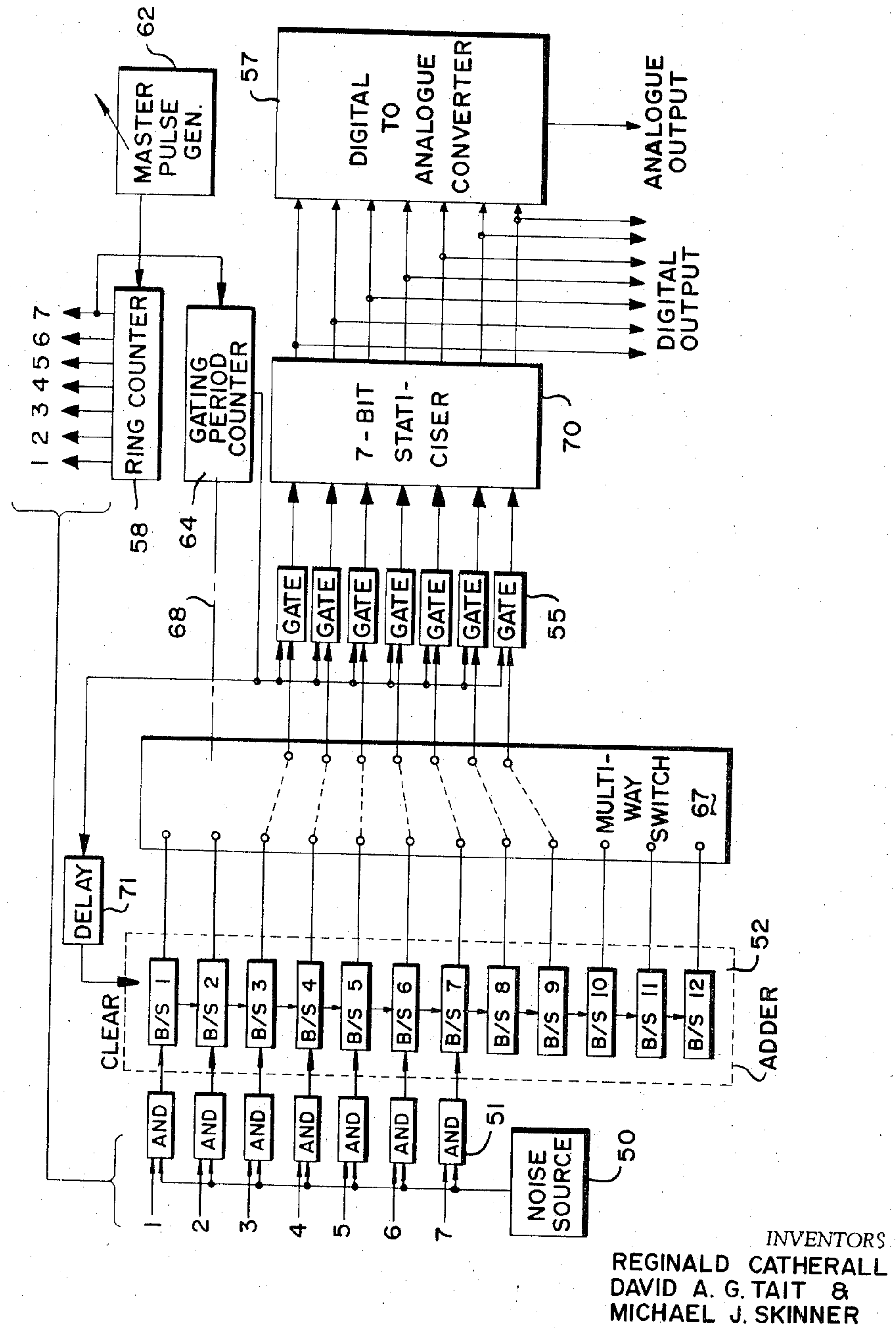
FIGURE 6 is a block diagram of a second digital embodiment of the invention.

The final embodiment shown in FIGURE 6 will not be described in detail as it is like that of FIGURE 5 in essential respects, though the second adder 53 has been eliminated along with many associated parts. All integration intervals are now alike and the bistable 63, gates 60, 61, 65 and 66 are unnecessary (along with the ring counter 59 and gate 56). At the end of each integration interval the pulse from the gating period counter 64 is used simply to open the gates 55 for a brief interval in order to transfer the number in the seven stages of the adder 52, which have been selected by the switch 67, to a staticiser or register 70. The staticiser holds the output for the duration of the ensuing integration interval. The same pulse from the counter 64 also clears the adder 52 in preparation for the next interval, but a delay circuit 71 prevents the adder being cleared until after the gates 55 have reclosed. In FIGURE 6, the broken line connections in the switch 67 are appropriate to $N=4$.

Although all the generators described have used only frequency dividers (the counters 64 are frequency dividers) in obtaining the required relationship between the gating period and the integration interval, i.e., in determining N, it is clear that frequency multipliers might also find a use.

While we have described and illustrated one specific embodiment of our invention, it will be clear that variations of the details of construction which are specifically illustrated and described may be resorted to without departing from the true spirit and scope of the invention as defined in the appended claims.

What we claim is:

1. A random signal generator comprising:
a plurality of bistable circuits, each of said bistable circuits being arranged to be set into selected states;
a random noise source;
means connecting said noise source to said plurality of bistable circuits to randomly set said bistable circuits, the setting of each of said bistable circuits being substantially uncorrelated with the setting of all of the others;
means for deriving an output signal from each of said bistable circuits representative of its state; and
means for combining the output signals to provide a composite signal having a randomly occurring one of a finite number of possible values of a predetermined characteristic of said composite signal.

2. A random signal generator comprising:
a plurality of bistable circuits, each of said bistable circuits being arranged to be set into one state or another state in accordance with the level of a random control signal;
a random noise source providing said random control signal;
gating means connecting said noise source to said plurality of bistable circuits to provide random, substantially uncorrelated levels of said control signal selectively to said bistable circuits;
means for deriving an output signal from each of said bistable circuits representative of said one state or said other state; and
means for combining the output signals to provide a composite signal having a randomly occurring one of a finite number of possible values of a predetermined characteristic of said composite signal.

3. A random signal generator according to claim 2, wherein said gating means establishes gating periods, further comprising:
means for integrating said composite signal over a number of said gating periods.

4. A random signal generator according to claim 2, wherein
each of said plurality of bistable circuits generates in said one state a zero signal and generates in said other state an analogue output signal, the amplitudes of the analogue output signals progressively increasing from one bistable circuit to the next bistable circuit;
said composite signal being an analogue sum signal whose amplitude equals the sum of the analogue output signals of all of said plurality of bistable circuits which are set to said other state.

5. A random signal generator according to claim 4, wherein the amplitudes of said analogue output signals increase by a factor of 2 from one bistable circuit to the next bistable circuit.

6. A random signal generator according to claim 4, wherein said gating means establishes gating periods, and further comprising:
two integrating circuits;
switching means for alternately applying said composite signal to said integrating circuits during alternate integrating intervals, each of said integrating intervals equaling a number N of said gating periods; and
an output terminal alternately connected to said integrating circuits for deriving a random output signal during each integrating interval from the integrating circuit to which said composite signal is not applied.

7. A random signal generator according to claim 6, further comprising:

further switching means for alternately discharging each integrating circuit prior to the beginning of an integrating interval in which the composite signal is applied thereto.

8. A random signal generator according to claim 6, further comprising:
a pulse generator;
frequency changing means connected to said pulse generator for providing a plurality of different frequency signals;
means connecting a first of said different frequency signals to said gating means for operating the same, the period of said first of said different frequency signals determining said gating period; and
means connecting a second of said different frequency signals to said switching means for controlling the same, the frequency of said second of said different frequency signals being a submultiple of that of said first signal.

9. A random signal generator according to claim 8, further comprising:
means for varying said gating period.

10. A random signal generator according to claim 6, further comprising:
means for varying said number N.

11. A random signal generator according to claim 6, further comprising:
means for varying said gating period.

12. A random signal generator according to claim 6, wherein each of said integrating circuits comprises a capacitor and means are provided for varying the capacitance of said capacitors.

13. A random signal generator comprising:
a plurality M of bistable circuits, each of said bistable circuits being arranged to be set into one state or another state in accordance with the level of a random control signal;
a random noise source providing said random control signal;
gating means connecting said noise source to said plurality of bistable circuits to provide random, substantially uncorrelated levels of said control signal selectively to said bistable circuits;
means for deriving an output signal from each of said bistable circuits representative of said one state or said other state; and
means for combining the output signals to provide a binary number.

14. A random signal generator according to claim 13, wherein said gating means establishes gating periods, further comprising:
first adding means for adding said binary numbers over an interval to provide a digital output signal, said interval equaling a number N of said gating periods.

15. A random signal generator according to claim 14, further comprising:
a digital-to-analogue converter coupled to said first adding means for deriving an analogue output signal from said digital output signal.

16. A random signal generator according to claim 14, further comprising:
second adding means; and
switching means connected to said first and second adding means so that said first and second adding means in alternate intervals add said binary numbers and for causing the adding means which is not adding said binary number to provide said digital output signal, said switching means further clearing each of said first and second adding means prior to the succeeding interval in which it is to be used to add said binary numbers.

17. A random signal generator according to claim 14, further comprising:
an output register; and switching means connected between said first adding means and said output register for transferring, at the end of each interval, the result in said first adding means to said output register and for clearing said first adding means, said output register providing said digital output signal.

18. A random signal generator according to claim 14, further comprising:

a further plurality P of bistable circuits;

means to interconnect said M bistable circuits with said P bistable circuits, so as to transfer carries, said interconnected bistable circuits forming said first adding means, the further plurality P of bistable circuits allowing addition to take place over a maximum required number N of said gating periods.

19. A random signal generator according to claim 18, wherein said digital output signal is an M bit signal and means are provided for selectively deriving said M bit digital output signal from bistable circuits $n$ to $n+M$ where:

$$1 \leq n \leq P$$

20. A random signal generator according to claim 19, further comprising:

means for varying the number N.

21. A random signal generator according to claim 20, further comprising:

switching means connected between said means for varying N and said first adding means for automatically selecting the bistable circuits, as N is varied, which will satisfy the requirement:

$$2^{n-1} \leq N < 2^n$$

22. A random signal generator according to claim 14, further comprising:

means for varying the number N.

23. A random signal generator according to claim 14, wherein said gating means comprises:

a plurality of gates, one for each of said plurality M of bistable circuits; and means for opening said gates sequentially.

24. A random signal generator according to claim 23, further comprising:

means for generating periodic signals with a basic period $t$;

means connecting said periodic signals to said means for opening said gates, said gating period being $Mt$ and said interval being $NMt$; and frequency dividing means coupled to receive said periodic signals for determining said interval.

25. A random signal generator according to claim 24, wherein said means for generating periodic signals is a pulse generator and means are provided for varying the frequency of said pulse generator.

26. A random signal generator comprising the combination of a plurality M of bistable circuits, each of said bistable circuits being switchable to one of two possible states in response to the level of a random control signal;

a plurality M of random noise sources for providing said random control signals;

gating means for connecting each of said noise sources to an associated one of said bistable circuits to provide random, mutually uncorrelated levels of said control signals to said bistable circuits;

means for deriving from each of said bistable circuits an output representative of one of said two possible states; and means for combining said output signals to provide a binary number.

References Cited

UNITED STATES PATENTS

| | | | |
|---|---|---|---|
| 2,773,185 | 12/1956 | Fulton et al. | 250—36 |
| 2,974,198 | 3/1961 | McLeod | 179—1 |
| 3,124,753 | 3/1964 | Gieseler | 328—61 |
| 3,171,082 | 2/1965 | Dillard | 328—60 |

MALCOLM A. MORRISON, *Primary Examiner.*

V. SIBER, *Assistant Examiner.*